Mar. 20, 1923.  
F. M. MARTIN  
1,448,758  
APPARATUS AND METHOD FOR SAMPLING ORES  
Filed Apr. 3, 1919  
5 sheets-sheet 1

INVENTOR  
Fred Mason Martin.  
BY  
Messimer and Austin.  
ATTORNEY

Mar. 20, 1923.
F. M. MARTIN
1,448,758
APPARATUS AND METHOD FOR SAMPLING ORES
Filed Apr. 3, 1919
5 sheets-sheet 4
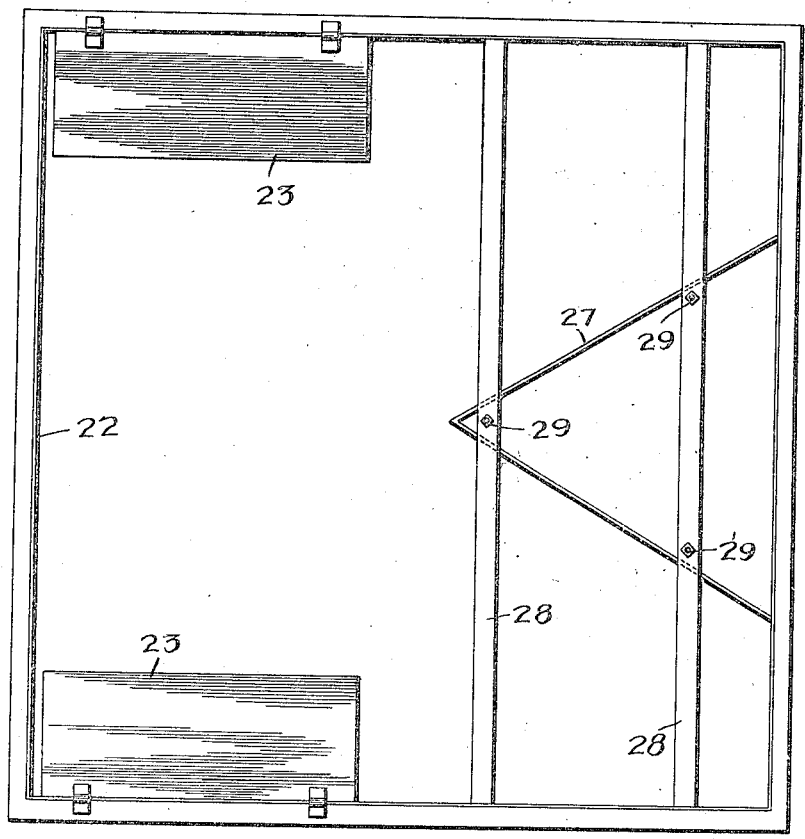
Fig. 4.
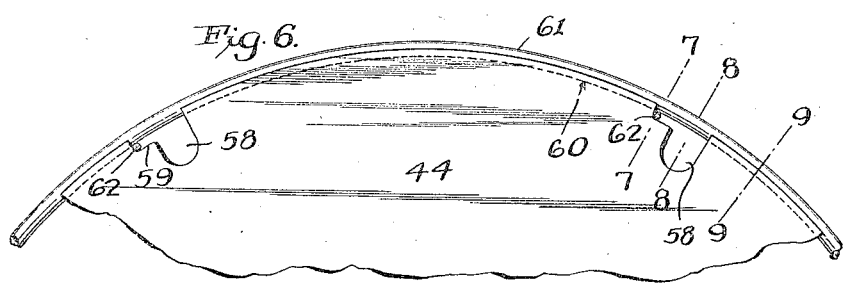
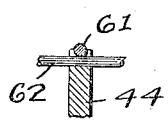 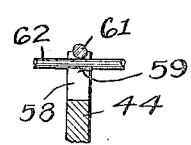 

Mar. 20, 1923.
F. M. MARTIN
1,448,758
APPARATUS AND METHOD FOR SAMPLING ORES
Filed Apr. 3, 1919      5 sheets-sheet 5
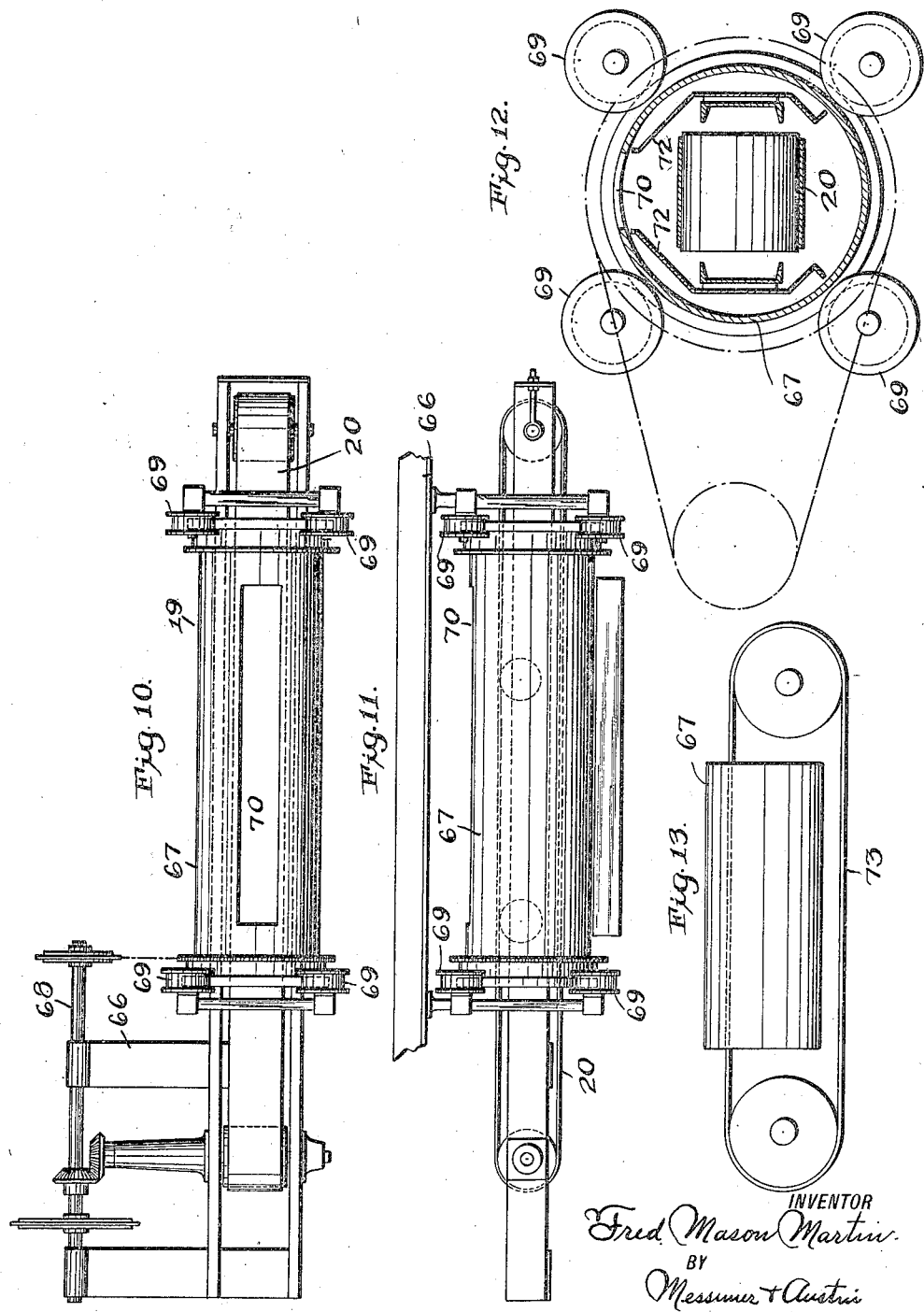
INVENTOR
Fred Mason Martin.
BY
Messmer + Austin
ATTORNEY Patented Mar. 20, 1923.

1,448,758

UNITED STATES PATENT OFFICE.

FRED MASON MARTIN, OF NEW YORK, N. Y., ASSIGNOR TO AMERICAN SMELTING & REFINING COMPANY, A CORPORATION OF NEW JERSEY.

APPARATUS AND METHOD FOR SAMPLING ORES.

Application filed April 3, 1919. Serial No. 287,137.

*To all whom it may concern:*

Be it known that I, FRED MASON MARTIN, a citizen of the United States, and resident of New York city, in the county of Kings and State of New York, have invented certain new and useful Improvements in Apparatus and Methods for Sampling Ores, of which the following is a specification.

The invention relates in general to a method of sampling material and specifically relates to a mechanical means for obtaining a fair sample of a mass of material which, due to its character, cannot be readily handled.

For instance, certain wet concentrates, ores, slimes, clays and similar plastic materials cohere in such a manner that difficulty is experienced in separating the mass so as to obtain samples. The present method of shoveling the mass by hand is laborious and expensive, and the obtaining of a fair sample of the entire mass handled is practically impossible and obviously leads to much dispute.

Accordingly, the primary object of the invention is to provide a simple and economic method of handling material of the class described to obtain therefrom a relatively small but fair sample of the entire mass of material. The invention features the method of first obtaining a constant and uniform flow of the material so as to insure that the various samples taken be proportional in weight to the weight of the lots they represent. The stream so formed is then broken up or agitated to minimize the adhesion of the particles for each other. Small amounts of the material are withdrawn periodically from the broken-up stream and the material so withdrawn assembled to form a sample of the entire mass treated.

Considering the mechanical phase of the invention, a further object is to provide a simple and economically operated machine for practising the above-outlined method automatically, and free of error which might be introduced by any personal factor.

Various other objects and advantages of the invention will be in part obvious from an inspection of the accompanying drawings and in part will be more fully set forth in the following particular description of one form of mechanism selected to suggest one instrumentality for practising the method and also selected to disclose one form of machine illustrating the mechanical phase of the invention, and the invention also consists in certain new and novel features of construction and combination of mechanical parts hereinafter set forth and claimed.

In the accompanying drawings:

Figure 4 is an enlarged plan view of the hopper looking down upon the device shown in Figures 2 and 3;

Figure 5 is a transverse sectional view taken vertically through the lower portion of the hopper shown in Figure 4 and through the upper run of the belt conveyor shown in Figure 2 and taken approximately on the line 5—5 of Figure 2;

Figure 6 is a fragmentary view in side elevation of one of the intermediate disks of the disintegrating elements of the machine shown in Figure 3;

Figure 1:
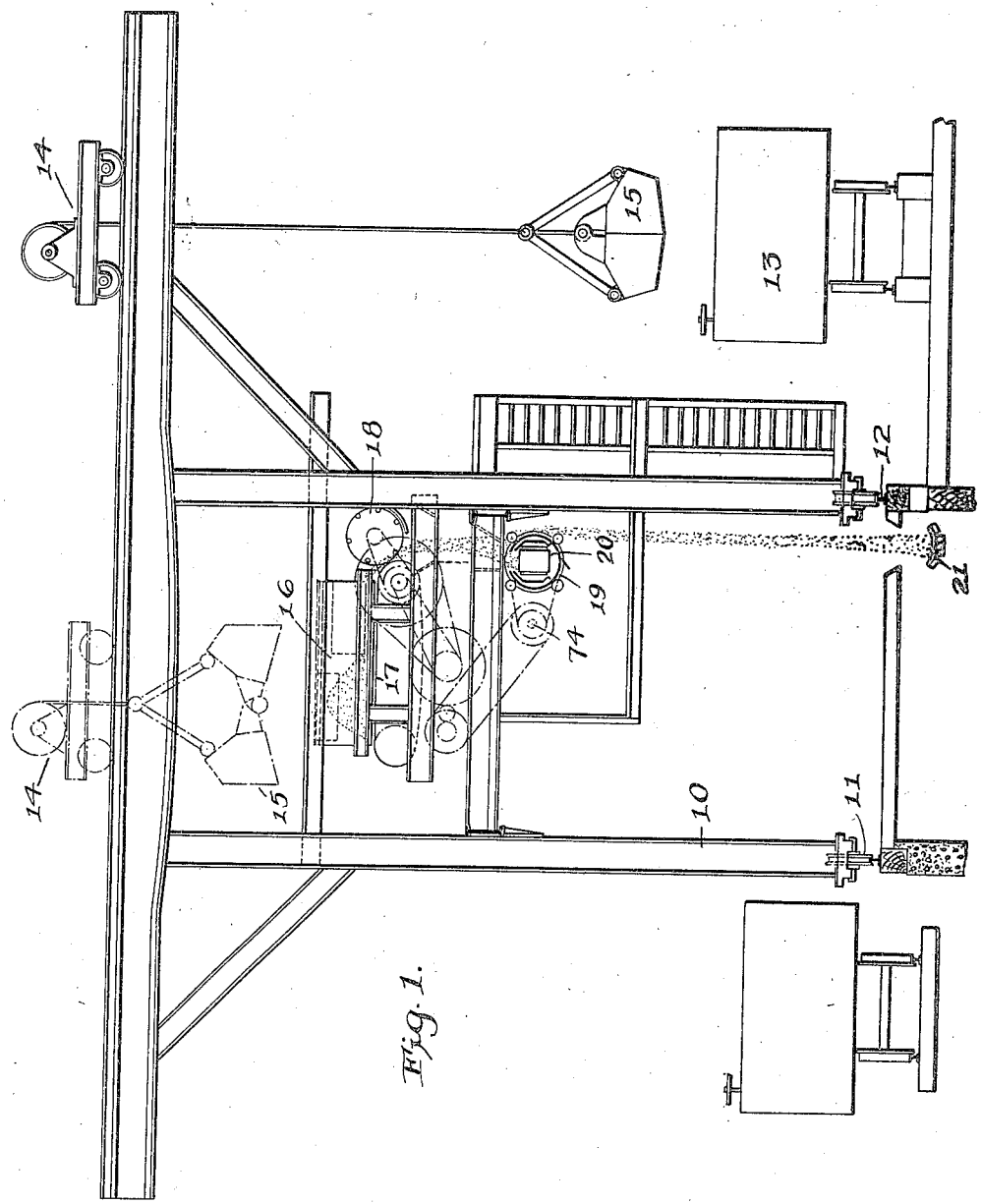
Figure 1 is a view in end elevation showing a preferred embodiment of my invention in operative position for sampling material unloaded from a vehicle.

Figures 7, 8 and 9 are detailed transverse sectional views through the periphery of the disk shown in Figure 6 and taken respectively on the lines 7—7, 8—8 and 9—9 of this figure;

Figure 10 is a plan view of the sampler element of the machine shown in end elevation in Figure 1;

Figure 11 is a view in side elevation of parts of the device shown in Figure 10;

Figure 12 is an enlarged transverse sectional view taken through the sampler element shown in Figures 10 and 11; and Figure 13 is a view in side elevation and largely diagrammatic showing a slightly modified form of mounting for the belt conveyor part of the sampler element.

Referring particularly to the general disclosure in Figure 1 there is illustrated a portable machine including a crane 10 provided with a wheel support 11 mounted upon tracks 12 and arranged to be moved parallel to the line of cars 13 carrying the material to be sampled. The crane is provided with a trolley 14 carrying a grab bucket 15 for reclaiming the material from the cars and for depositing the material in a fixed hopper 16, mounted on the crane framework. The material in the hopper is moved by a belt conveyor 17 defining the bottom of the hopper, across the hopper and discharged therefrom into engagement with a disintegrating device 18 which acts on the material to break up the stream discharged from the hopper. The broken-up stream is then permitted to fall onto a sampler 19 which acts to separate the stream into two parts, one part being deposited upon a sampler belt-conveyor 20 and the other, or rejected, part being discharged from the surface of the separator onto a conveyor belt 21 which acts to convey the major part of the material away from the device.

Figure 2:
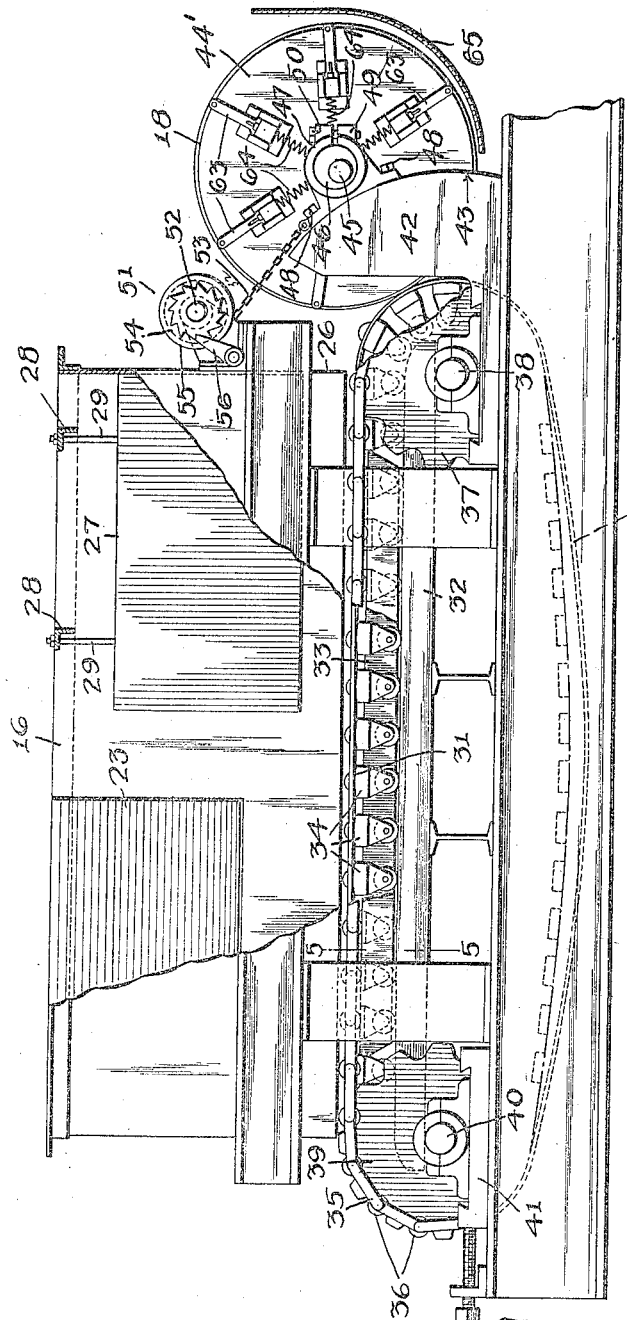
Figure 2 is an enlarged view of the material-receiving hopper and disintegrating elements of the machine shown in Figure 1 and with parts broken away to show internal structure.
Figure 3:
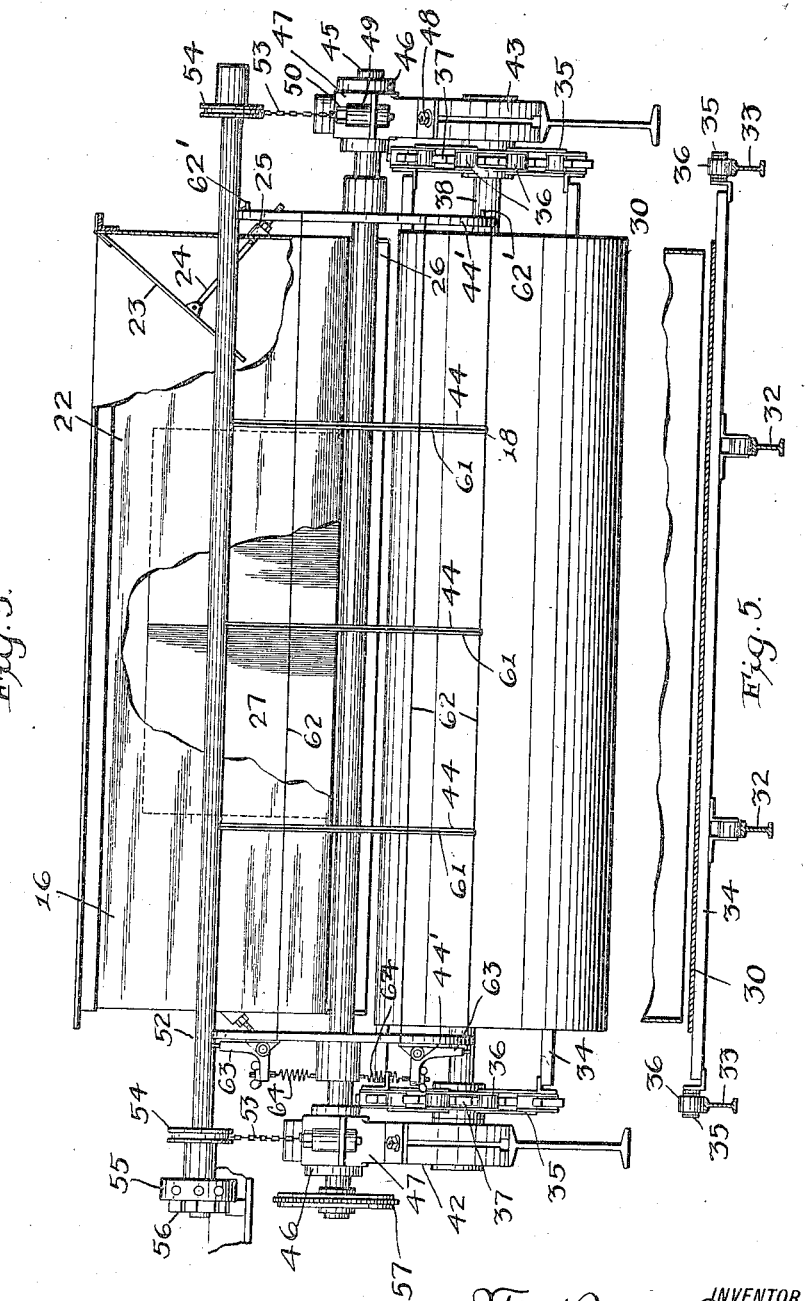
Figure 3 is an enlarged view in right end elevation of the device shown in Figure 2 and with parts broken away.

Referring particularly to Figures 2, 3 and 4 for a more detailed description of the hopper, it will be noted that the hopper includes a rectangular receptacle 22 formed of upstanding sides and opened at the top to receive the material as it is discharged from the grab bucket 15 as shown in dotted lines in Figure 1. The receiving end of the hopper is provided with a pair of oppositely disposed, downwardly and inwardly inclined deflectors 23 which act to distribute the material discharged from the grab bucket and dispose the same evenly on opposite sides of the longitudinal medial line through the hopper. Each of the deflectors is pivotally connected to the adjacent side of the hopper at its upper edge. The deflectors are each held in adjusted swinging position by means of a lifting rod 24 which passes through the adjacent side and is held in set position by nuts 25 as shown in Figure 3. The hopper is provided at its discharge end with an opening 26 having the width equal to that of the hopper but relatively small in its vertical dimension as shown in Figure 3. A plow 27, triangular-shaped in plan as shown in Figure 4, is mounted at the discharge end of the hopper and is positioned above the opening 26. The plow is mounted for vertical adjustment on transverse bars 28 constituting internal braces for the hopper. Vertically adjustable hanging rods 29 connect the bars 28 with the advance edge and with opposite sides of the plow. By this construction the bottom edge of the plow is set at any desired distance above the conveyor 17 so as to regulate the depth of the stream of material delivered through the opening 26 to the disintegrator 18.

The belt conveyor 17 includes an endless material-receiving belt 30, the upper run of which fits relatively close to the open bottom of the hopper as shown in Figure 5 and constitutes a movable bottom for said hopper. This belt is relatively wide and extends beyond opposite lateral sides of the hopper so as to minimize any tendency of leakage between the hopper and the conveyor. The belt encircles an endless driving frame 31, and has its upper run resting on the frame and held thereto frictionally but is otherwise unsecured to the frame. A plurality of longitudinally extending tracks, in Figure 5 shown to be four in number, extend parallel to the length of the hopper with the two inside tracks 32 positioned below the hopper and the two outside tracks 33 offset laterally to the outside of the hopper. The frame includes a series of transversely disposed bars 34 connected at their outer ends by roller chains 35. The frame is designed to engage and slide on the tracks through roller casters 36. The chains of the frame are passed about end sprocket wheels, one set of which, 37, at the discharging end of the conveyor constitute driving sprockets and are mounted upon and driven from a power shaft 38. The other set of sprockets 39 is carried by a shaft 40 mounted in take-up bearings 41 by means of which the tension on the conveyor frame is adjusted. The parts are so proportioned and so spaced from the tracks that when the frame is carried from its horizontal path into its path around the sprocket wheels, the belt 30 is moved clear of the sprocket wheels thus permitting the use of a belt of unusual width.

The disintegrator 18 is adjustably mounted at opposite ends upon a pair of housings 42 mounted adjacent the discharge end of the conveyor 17. Each of these housings is provided with a bearing surface 43 concentrically disposed with reference to the axis of rotation of the shaft 38 and designed to support the disintegrator in one of a plurality of positions disposed about the discharge end of the belt 30.

The disintegrator includes a plurality of intermediate, parallel, cutting disks 44 and end supporting disks 44' all fixed to a driving shaft 45 so as to rotate therewith. As shown in Figure 2, opposite ends of the shaft are each mounted within an eccentric bushing 46 adjustably mounted in a circular bearing block 47. The blocks 47 are each bodily movable in an arc on the bearing faces 43 and are each held in adjusted position thereon by clamping nuts 48. The bearing blocks 47 each includes a circular split ring-shaped extension 49 and clamps the bushing in its angularly adjusted position by a clamping bolt 50.

The disintegrator is adjusted in its arc of movement relative to the opening 26 and to the discharge end of the belt conveyor by means of a hoisting device 51. This device includes a drum shaft 52 mounted on the framework of the hopper and connected to the bearing blocks 47 by means of a pair of chains 53 passing about drum wheels 54 mounted on the shaft. A capstan 55 at one end of the shaft provides a means for rotating the shaft and thus lifting the disintegrator. Insurance against the slipping of the disintegrator before it is secured in adjusted position is provided by means of a pawl and ratchet connection 56 between the shaft and the support.

The shaft 45 is provided at one end with a sprocket wheel 57 by means of which the disintegrator may be rotated either in the same direction or counter to the direction of movement of the stream of material fed thereto. As shown in Figure 6, the intermediate cutting disks 44 are provided with circumferentially spaced apart marginal recesses 58 provided with raised shoulder portions 59. The peripheries of each of these intermediate disks are grooved to provide a seat 60 for binding wires 61 drawn under tension and fitted into these peripheral seats. The binding wires act to hold a plurality of cutting or disintegrating wires 62 positioned on the shoulders 59. The disintegrating wires extend between the cutting disks and the end disks 44′ and act upon the stream of material cut by the disks to break up or disintegrate the strips so cut. Each of these wires 62 has one end thereof fastened to one of the end disks by means of a pin 62′ and has its opposite end fixed to the other end disk. Means are provided at this other end disk for placing the wires under tension. This tensioning means includes a bell crank lever 63, one arm of which is attached to the wire and the other arm of which is acted upon by an adjustable tension spring 64.

As shown in Figure 2, the outer and under side of the disintegrator is provided with a sheath 65 which extends transversely across the disintegrator and has its lower portion curved to a radius slightly longer than the radii of the disks. The sheath is adjustably supported so that its lower delivery edge is in close proximity to the disks and is disposed so as to prevent the scattering of material which may be occasioned by the action of the disintegrator and to assure a uniform and proper delivery of the material to the sampler.

The sampler 19 includes a framework 66 (see Figure 10) for supporting a revolving cylinder 67 and its driving mechanism 68. This cylinder is opened at opposite ends and is rotatably mounted upon and guided by trunnion wheels 69 journalled in the framework. The cylinder is thus mounted for rotary movement about its axis. The side of the cylinder is provided with a slotted opening 70 positioned in the path of the stream of the material falling from the disintegrator as shown in Figure 1.

A belted conveyor 20 is carried by the framework 66 and extends through and beyond opposite ends of the cylinder so as to receive the material admitted into the cylinder through the opening 70. Skirt boards 72 are carried by the framework and are positioned within the cylinder on opposite sides of the belt as shown in Figure 12.

In the form shown in Figures 10 and 11 both the upper and lower runs of the belt are passed through the interior of the cylinder. In the form shown in Figure 13, the lower run 73 of the belt is positioned to the outside of and below the cylinder but in all other respects the arrangement of parts is the same as described for the preferred form.

It is understood that the several movable elements are operatively connected, as by means of the belts indicated by dot and dash lines in Figure 1, with a single power plant indicated diagrammatically by the power shaft 74.

In operation, and assuming that the several movable elements of the device are operatively connected to the power system so as to cause them to operate at the desired relative speeds, the grab bucket is actuated as usual with such devices and load after load of the material to be sampled is raised thereby and discharged into the receiving end of the hopper, as shown in Figure 1.

The deflectors on opposite sides of the hopper tend to distribute the incoming loads of material on opposite sides of the medial line through the nose of the plow and as the material is carried by the belt conveyor into engagement with the plow it will be caused to spread out in a layer of uniform thickness and the conveyor will discharge the same uniformly through the outlet opening 26. As the layer of material is fed to the disintegrator, it is cut into longitudinal strips by means of the cutting disks, and the disintegrating wires moving upwardly through the mass, usually at relatively high speed, will tend to break up the strips before the material is permitted to fall towards the sampler. Even if wet and sticky the material is separated and falls in a stream of separate particles.

As the slotted opening in the sampler comes uppermost in the rotation of the cylinder, an amount of the material dependent upon the speed of rotation of the cylinder and the width of the slotted opening will be permitted to drop through the opening and fall upon the sampler conveyor. The balance of the material rejected falls or is thrown off of the outer side of the sampler and is discharged onto the conveyor belt 21 or other receptacle disposed to receive the same. When the material is too sticky to fall freely it will have to be scraped off the sampler. The sampler conveyor belt will ordinarily be travelling at relatively low speed so that it will constitute a means for collecting the small amount of material admitted thereto through the opening and will act as a means for assembling this small amount of material into a sample of the entire charge fed past the sampler.

By means of a device of the character thus outlined it is possible to obtain a fair sample of the material, even though this material be of a plastic nature and otherwise difficult to handle. With reference to the hopper an advantage is attained over any attempt to feed the irregular mass of material through an opening, the adjacent sides of which are disposed in planes perpendicular to the direction of motion of the material, in that there is less stress upon the mechanism of the conveyor and less power consumed.

When the plow outlined is used the supply of material discharged by the conveyor to the disintegrator is more continual and uniform than heretofore for apparently the wet material does not exhibit any tendency to pile up on the plow. Using a relatively large belt on the conveyor gives the feeder a large capacity at slow speed. Further, with the particular type of conveyor disclosed lateral or side creep of the belt is minimized and belt tension is eliminated as the driving or carrying effect is proportioned to the weight of the load only and relative movement between the belt and its carrying frame is minimized so as to eliminate wear on the underside of the belt.

As the sampler is timed to present its slotted opening in accurately-timed sequence to the rate of feed of the stream, the same amount of sample is taken from the mass sampled irrespective of variations in speed and independent of any personal factor of error.

Having thus described my invention, I claim:

1. In the art of obtaining samples of a sticky material, the method which consists in causing a mass of the material to move continuously in a compact stream of substantially equal cross-sectional area thereby to insure the passage per unit of time of equal amounts of the material, causing said stream to fall freely in air disintegrating said compact stream while falling freely and unrestrained, periodically removing from equally spaced apart portions of said uniform disintegrated stream, a relatively small amount of the material and assembling all of said small amounts removed from the stream to form a fair sample of the whole mass.

2. In the art of obtaining samples of wet slimy material, the method which consists in causing a mass of the material to be discharged from restraint continuously in a stream of substantially equal cross-sectional area, causing moving mechanism to act on said stream when so discharged to break up the same and to minimize the adhesion of the particles thereof for each other, periodically removing from equally spaced apart portions of said uniform and broken up stream, a relatively small amount of the material and assembling all of said small amounts to form a fair sample of the whole mass.

3. In the art of obtaining samples of material, the method which consists in causing a mass of the material to move continuously in a stream of substantially equal cross-sectional area, causing moving mechanism to act on said stream to break up the same and to minimize the adhesion of the particles thereof for each other and causing said broken up stream to fall freely in an open space, periodically removing from equally spaced apart portions of said falling stream, a relatively small amount of the material and assembling all of said small amounts so removed to form a fair sample of the whole mass.

4. In the art of obtaining samples of material having a plastic or cohesive characteristic, the method which consists in causing a uniform stream of the material to fall continuously, combing said falling stream of material upwardly thereby to disintegrate the same, and periodically abstracting from the agitated stream relatively small amounts of the material.

5. In the art of obtaining a series of samples of material having a plastic or cohesive characteristic, the method which consists in causing a uniform stream of the material to fall continuously, combing said falling stream of material in a direction opposite to its direction of fall thereby to disintegrate the same, periodically abstracting from the agitated stream relatively small amounts of the material and assembling all of said small amounts abstracted thereby to obtain a sample of the whole amount of material in the stream.

6. In a device of the class described, the combination of a supporting structure, a hopper carried by said structure, means for feeding a stream of the material to be sampled and permitting the same to fall freely, said stream having substantially constant cross-sectional area, means spaced from the hopper for disintegrating the discharged stream and a single sampling drum carried by said support for withdrawing samples of the material from the disintegrated stream.

7. In a device of the class described, the combination of a supporting structure, a hopper carried by said structure, means at the discharge end of said hopper for feeding a stream of the material to be sampled from said hopper in a substantially uniform and regulated stream, means beyond the feeding means for disintegrating the uniform stream, and means for withdrawing samples of the material from the disintegrated stream.

8. In a device of the class described, the combination of a supporting structure, means carried by the structure for feeding a stream of the material to be sampled from said hopper in a substantially uniform stream, means carried by said support for withdrawing samples of the material from the disintegrated stream, a conveyor carried by the support for receiving the samples and another conveyor carried by the support for receiving the remainder of the stream.

9. In a device of the class described, the combination of a hopper having a discharge opening, a conveyor acting on the contents of the hopper to move the same in a continuous stream of uniform cross section through said discharge opening, cutting means at the discharge end of the conveyor for disintegrating the material of the stream after it is discharged from said opening, a single power means for driving said conveyor and cutting means in unison, and a sampler for taking a sample of said cut material.

10. In a machine for sampling material having an adhesive character, the combination of a stream forming device including a belt conveyor adapted to receive and discharge the adhesive material to be sampled, means for maintaining the cross section area of the discharge stream uniform, a disintegrating device positioned to receive the material discharge from the belt conveyor and provided with movable elements adapted to engage the material to reduce the adhesive character of the stream, a single power means for driving the conveyor and the movable elements of the disintegrating device and periodically actuated means operatively connected to be driven from said power means for sampling the disintegrated material.

11. In a machine for sampling material having an adhesive character, the combination of a stream forming device including movable means adapted to receive and discharge the adhesive material to be sampled, means for maintaining the cross section area of the discharged stream uniform, a disintegrating device positioned to receive the material discharged from the movable means and said disintegrating means provided with movable elements adapted to engage the material to reduce the adhesive character of the stream a sampling device for periodically abstracting small portions of material from said stream after it is discharged from the disintegrating device and power means for actuating said movable means, said disintegrating device and said sampling device in unison.

12. In a machine for sampling material having an adhesive character, the combination of a stream forming device adapted to receive and discharge the adhesive material to be sampled, means for maintaining the cross section area of the discharged stream uniform, a disintegrating device positioned to receive the material discharged from the stream forming device and provided with movable elements adapted to engage the material to reduce the adhesive character of the stream, a sampling device for periodically abstracting small portions of material from said stream after it is discharged from the disintegrating device and means for assembling said small portions to constitute a fair sample of the material in the stream.

13. In a device of the class described, a sampler including a cylinder mounted for rotary movement about its axis, and means for directing a stream of material to be sampled against the side of the cylinder, said cylinder provided with an opening revolved across the stream to admit to the interior of the cylinder a part of the stream at each rotation of the cylinder and a conveyor movable axially through the cylinder to remove the admitted portion of the material.

14. In a device of the class described, a sampler including a cylinder mounted for rotary movement about its axis, means for directing a stream of material to be sampled against the side of the cylinder, said cylinder provided with an opening revolved across the stream to admit to the interior of the cylinder a part of the stream at each rotation of the cylinder and means distinct from the cylinder and mounted within the cylinder for receiving the part of the stream admitted to the interior of the cylinder.

15. In a device of the class described, the combination of an open end cylinder mounted for rotary movement about its axis, means for causing a stream of material to be sampled to fall onto the side of said cylinder, said cylinder provided with an opening in line with said falling stream and conveying means within the cylinder and extending from an open end thereof for receiving the material admitted through said opening and for conveying the same out of the cylinder.

16. In a device of the class described, the combination of an open end cylinder mounted for rotary movement about its axis, means for causing a stream of material to be sampled to fall onto the side of said cylinder, said cylinder provided with an opening in line with said falling stream and a belt conveyor having a receiving part disposed within the cylinder and below the opening and a discharging part positioned exteriorly of the cylinder.

17. In a device of the class described, the combination of an open end cylinder mounted for rotary movement about its axis, means for causing a stream of material to be sampled to fall onto the side of said cylinder, said cylinder provided with an opening in line with said falling stream, a belt conveyor having a receiving part disposed within the cylinder and below the opening, a discharging part positioned exteriorly of the cylinder and a scraper acting on the exterior of the cylinder for removing material which may adhere thereto.

18. In a device of the class described, the combination of an open end cylinder mounted for rotary movement about its axis, means for causing a stream of material to be sampled to fall onto the side of said cylinder, said cylinder provided with an opening in line with said falling stream and a belt conveyor having a receiving part disposed within the cylinder and below the opening, a discharging part positioned exteriorly of the cylinder and a second belt conveyor for receiving and conveying away the material discharged from the outside of the cylinder.

Signed at Hayden in the county of Gila and State of Arizona this 19th day of March, A. D. 1919.

FRED MASON MARTIN.